(12) United States Patent
Payne et al.

(10) Patent No.: US 6,582,775 B1
(45) Date of Patent: Jun. 24, 2003

(54) PROCESS FOR MAKING AN OPTICAL COMPENSATOR FILM COMPRISING PHOTO-ALIGNED ORIENTATION LAYER

(75) Inventors: Jason A. Payne, Rochester, NY (US); Joseph W. Hoff, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/194,100

(22) Filed: Jul. 12, 2002

(51) Int. Cl.[7] ................................................. C08F 2/48
(52) U.S. Cl. ................... 427/508; 427/162; 427/331; 427/348; 427/385.5; 427/398.1; 427/407.1; 427/428
(58) Field of Search ................... 427/508, 162, 427/331, 348, 385.5, 398.1, 407.1, 428

(56) References Cited

U.S. PATENT DOCUMENTS 5,853,801 A 12/1998 Suga et al.
6,160,597 A 12/2000 Schadt et al.

FOREIGN PATENT DOCUMENTS

| EP | 0 646 829 | 7/2002 |
| JP | 2002-122741 A | * 4/2002 |

\* cited by examiner

*Primary Examiner*—Bernard Pianalto
(74) *Attorney, Agent, or Firm*—Chris P. Konkol

(57) ABSTRACT

A process for making an optical compensator comprising the steps of coating a photo-alignable resin in a solvent onto a substrate; drying the resin-containing coating to form a orientable layer; heat treating the orientable layer before and/or after orientation, orienting the orientable layer in a predetermined direction; coating an anisotropic liquid crystal compound in a solvent carrier onto the orientation layer; drying the anisotropic layer. In a preferred embodiment, these steps are repeated so that the optical axis of a first anisotropic layer is positioned orthogonally relative to the respective optical axis of a second anisotropic layer about an axis perpendicular to the plane of the substrate.

26 Claims, 7 Drawing Sheets

PROCESS FOR MAKING AN OPTICAL COMPENSATOR FILM COMPRISING PHOTO-ALIGNED ORIENTATION LAYER

CROSS-REFERENCE TO RELATED APPLICATIONS

This application is cofiled as part of a group of the following commonly assigned applications under U.S. Ser. Nos. 10/194,162, 10/195,093, 10/195,094, 10/194,097, 10/194,750, and 10/194,130, all filed Jul. 12, 2002, the contents of which are incorporated herein by reference.

FIELD OF THE INVENTION

This invention relates to a method for making an optical compensator for improving viewing-angle characteristics of liquid crystal displays.

BACKGROUND OF THE INVENTION

Current rapid expansion in the use of liquid crystal displays (LCDs), in various areas of information display, is largely due to improvements of display qualities. Contrast, color reproduction, and stable gray scale intensities are important display qualities for electronic displays, which employ liquid crystal technology. The primary factor limiting the contrast of a liquid crystal display is the propensity for light to "leak" through liquid crystal elements or cell, which are in the dark or "black" pixel state. Furthermore, the leakage and hence contrast of a liquid crystal display are also dependent on the angle from which the display screen is viewed. Typically the optimum contrast is observed only within a narrow viewing angle centered about normal incidence to the display and falls off rapidly as the viewing angle is increased. In color displays, the leakage problem not only degrades the contrast, but also causes color or hue shifts with an associated degradation of color reproduction. In addition to black-state light leakage, the narrow viewing angle problem in typical twisted nematic liquid crystal displays is exacerbated by a shift in the brightness-voltage curve as a function of viewing angle because of the optical anisotropy of the liquid crystal material.

Thus, one of the major considerations for evaluating the quality of such displays is the viewing-angle characteristics, which describes a change in contrast ratio from different viewing angles. It is desirable to be able to see the same image from a wide variation in viewing angles and this ability has been a shortcoming with liquid crystal display devices. One way to improve the viewing-angle characteristics is to insert an optical compensator (also referred to as a compensation film, retardation film, or retarder) situated between the polarizer and liquid crystal cell. An optical compensator can widen the viewing-angle characteristics of liquid crystal displays, and in particular of Twisted Nematic (TN), Super Twisted Nematic (STN), Optically Compensated Bend (OCB), In Plane Switching (IPS), or Vertically Aligned (VA) liquid crystal displays. These various liquid crystal display technologies have been reviewed in U.S. Pat. No. 5,619,352 (Koch et al.), U.S. Pat. No. 5,410,422 (Bos), and U.S. Pat. No. 4,701,028 (Clerc et al.).

Optical compensators are disclosed in U.S. Pat. No. 5,583,679 (Ito et al.), U.S. Pat. No. 5,853,801 (Suga et al.), U.S. Pat. No. 5,619,352 (Koch et al.), U.S. Pat. No. 5,978,055 (Van De Witte et al.), and U.S. Pat. No. 6,160,597 (Schadt et al.). A compensator based on discotic liquid crystals according to U.S. Pat. No. 5,583,679 (Ito et al.) and U.S. Pat. No. 5,853,801 (Suga et al.), which discotic liquid crystals have negative birefringence, is widely used. Although it offers improved contrast over wider viewing angles, it suffers larger color shift for gray level images compared to a compensator made of liquid crystalline materials with positive birefringence, according to Satoh et al. ("Comparison of nematic hybrid and discotic hybrid films as viewing angle compensator for NW-TN-LCDs", *SID 2000 Digest*, pp. 347–349, 2000).

In order to achieve improved performance in the contrast ratio while limiting color shift, one alternative is to use a pair of crossed liquid crystal polymer films (LCP) on each side of a liquid crystal cell, as discussed by Chen et al. ("Wide Viewing Angle Photoaligned Plastic Films", *SID 99 Digest*, pp.98–101 1999). A liquid pre-polymer is also used to make a layer for aligning or orientating the LCP layer. This paper states that "since the second liquid pre-polymer/LCP retarder film is coated directly on top of the first LCP retarder film, the total thickness of the final wide-view retarder stack is only a few microns thin." Although this method provides a very compact optical compensator, one of the challenges of this method is to make two LCP layers crossed, particularly in a continuous roll-to-roll manufacturing process.

U.S. Pat. No. 5,853,801 (Suga et al.) teaches a continuous process of preparing an optical compensator by, for example, coating a transparent resin layer on a transparent support, subjecting the layer to a brushing treatment to form an orientation layer, coating a solution of a discotic liquid-crystal compound upon the orientation layer, drying the solution of the liquid-crystal compound to form a coated layer, and heating the coated layer to form a discotic nematic phase.

In EP 646829 A1, the optical compensator is prepared by a process similar to that described by Suga et al. but wherein the steps are performed discontinuously. Thus, the process is not suitable for high volume industrial production.

U.S. Pat. No. 6,160,597 (Schadt et al.) discloses steps for making an optical compensator using discontinuous or independent steps comprising drying, heating, and cooling treatments for periods as long as one hour or more, and therefore this process is also not suitable for high-volume industrial production.

PROBLEM TO BE SOLVED

A problem in the manufacture of optical compensators for widening the viewing-angle characteristics of liquid crystal displays has been preventing defects, especially in a process suitable for industrial production.

In particular, in the preparation of optical compensators in which a series of aligning layers and anisotropic liquid crystal layers have been coated on a support, and in which an anisotropic liquid crystal (LC) layer is UV cured before the application of the next aligning layer, achieving a sufficient and consistent contrast ratio has been difficult. Furthermore, poor adhesion has been encountered between the aligning layer and the LC layer.

SUMMARY OF THE INVENTION

The invention provides an improved process for making an optical compensator for use with liquid crystal displays, which process involves forming an orientation layer and an anisotropic nematic liquid crystal (LC) layer on a support made from cellulose triacetate, glass, or other suitable material. Each aligning layer is photo-aligned to become the orientation surface (command surface) before the application of the next anisotropic layer. In particular, it has been found that heat treating the photo-aligned orientation layer after it has been dried improves the achievable tilt angle of the orientation layer. Furthermore, such a post-dry heat treatment has also been found to improve the adhesion.

The present process can be used to make an optical compensator film that widens the viewing angle characteristics of liquid crystal displays, and in particular of Twisted Nematic (TN), Super Twisted Nematic (STN), Optically Compensated Bend (OCB), In Plane Switching (IPS), or Vertically Aligned (VA) liquid crystal displays.

There is provided by the invention a process for the preparation of a continuous optical compensator sheet comprising the continuous steps of:

i) coating, in a solvent, a liquid of a photo-alignable resin for forming an orientation layer onto a surface of a continuous transparent film;

ii) drying the resin-containing coating to form a transparent resin layer;

iii) subjecting the transparent resin layer to a photo-alignment treatment whereby an orientation layer is formed;

iv) heat treating the orientation layer wherein the heat treatment can occur either before or after, or both before and after, the alignment process;

v) coating a liquid-crystalline compound in a solvent on the orientation layer to form a liquid-crystal-containing coating;

vi) drying the liquid-crystal-containing coating to form a liquid-crystal-containing layer;

vii) thermally treating the liquid-crystal-containing layer in order to form an anisotropic liquid crystal layer exhibiting its functional phase, preferably the nematic phase of a nematic liquid-crystal compound.

An preferred optional further step comprises winding up the transparent film having the orientation layer and the anisotropic liquid crystal layer. Additional preferred embodiments of the above-mentioned process for preparing an optical compensator film are as follows:

1) The above process wherein step i) is conducted by using a slot-hopper method to apply the resin-containing coating onto the transparent support. In other embodiments, a slide, gravure, rod, or roll coating method can be is used to coat the resin material.

2) The above process wherein step iii) is conducted by exposing a surface of the transparent resin layer of the continuous transparent film to polarized ultraviolet light to impart orientation to the transparent resin layer.

3) The above process wherein step v) is conducted by coating a polymerizable or crosslinkable nematic compound having liquid crystalline properties, in a solvent, onto the orientation layer; and step vii) comprises cooling the coated layer to form a nematic phase and thereafter exposing the layer to light so as to cure the nematic compound.

4) The above process wherein step ii) is conducted by vaporizing the solvent from the coating by applying heated gas or infrared radiation and/or microwave radiation to both sides of the transparent film, or bringing the side opposite of the transparent film opposite the coating into contact with at least one heated roller, preferably a plurality of heated rollers.

5) The above process wherein step ii) is conducted by vaporizing the solvent from the coating by applying heated gas or infrared radiation or microwave radiation to only the side of the transparent film opposite the coated layer.

In another embodiment, there is provided in accordance with the present invention a process for the preparation of a continuous optical compensator sheet comprising at least two orientation layers, which process comprises the continuous steps of:

i) coating, in a solvent, a liquid of a photo-alignable resin for forming a second orientation layer onto a surface of a continuous transparent film already having a first orientation layer and an anisotropic liquid-crystalline layer thereon (i.e., a continuous transparent film having the orientation layer and the anisotropic liquid-crystal layer thereon);

ii) drying the coating to form a transparent resin layer; and iii) subjecting the transparent resin layer to a photo-alignment treatment, whereby a second orientation layer is formed;

iv) heat treating the second orientation layer wherein the heat treatment can occur either before or after, or both before or after, the alignment step iii);

v) coating an anisotropic liquid-crystalline compound, in a solvent, onto the second orientation layer to form a liquid-crystal-containing layer;

vi) drying the a liquid-crystal-containing layer;

vii) thermally treating the a liquid-crystal-containing layer in order to form an anisotropic liquid-crystal-containing layer having a functionally oriented phase;

viii) optionally winding up the compensator sheet comprising the transparent support, the orientation layers, and the anisotropic liquid-crystal layers.

Preferred embodiments of the above-mentioned process for preparing an optical compensator sheet are as follows:

1) The above process wherein step i) is conducted by continuously bringing the transparent support having the orientation layer and the anisotropic liquid crystal layer into coating contact with a slot hopper to coat the resin-containing material. In other embodiments, a slide gravure, rod, or roll coating method is used to coat the liquid.

2) The above process wherein step iii) is conducted by exposing a surface of the transparent resin layer to polarized ultraviolet light to impart orientation to the transparent resin layer, whereby a second orientation layer is formed. Preferably, the orientation of the second orientation layer is such that the optical axis of the first anisotropic liquid crystal layer is positioned orthogonally relative to the respective optical axis of the first anisotropic layer (to which the second orientation layer was applied thereon about an axis perpendicular to the plane of the support.

3) The above process wherein the step v) comprises coating a polymerizable or crosslinkable nematic compound having liquid crystalline properties, in a solvent, onto the second orientation layer to form a second anisotropic layer; and step vii) comprises cooling the liquid-crystal containing layer to form a nematic phase, and thereafter exposing the nematic phase to light so as to cure the nematic compound.

4) The above process wherein step ii) is conducted by vaporizing the solvent from the coating by applying heated gas or infrared or microwave radiation to both sides of the transparent film, or bringing the side of the transparent film opposite the coating into contact with one or more heated rollers.

5) The above process wherein step ii) is conducted by vaporizing the solvent from the coated layer by applying heated gas or infrared rays or microwave rays to only the side of the transparent film opposite the coating.

6) The above process wherein the step vii) is conducted by cooling the liquid-crystal-containing layer to form a positive birefringence nematic phase, whereby an anisotropic nematic liquid-crystal-containing layer is formed.

DETAILED DESCRIPTION OF THE INVENTION

Figure 1:
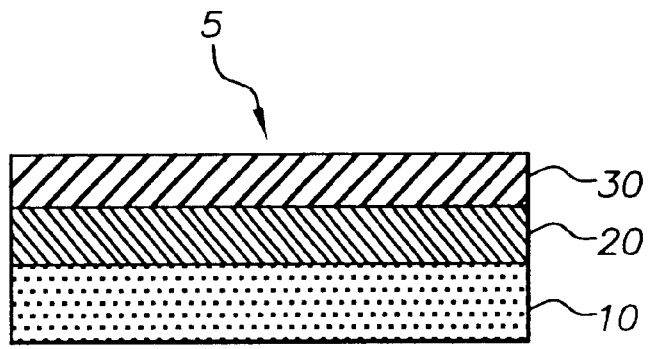
FIG. 1 is a cross-sectional schematic view of a compensator prepared by the process of the present invention.

The current invention regarding the optical compensator for liquid crystal displays is described by referring to the drawings as follows.

FIG. 1 shows a cross-sectional schematic view of an optical compensator 5 which can be made according to the present invention. This compensator comprises a substrate 10 of transparent material, such as glass or polymer. It should be understood that to be called as a substrate, a layer must be solid and mechanically strong so that it can stand alone, and support other layers. A typical substrate is a transparent support made of triacetate cellulose (TAC), polyester, polycarbonate, polysulfone, polyethersulfone, or other transparent polymers, and has a thickness of 25 to 500 micrometers. Substrate 10 typically has low in-plane retardation, preferably less than 10 nm, and more preferably less than 5 nm. In some other cases, the substrate 10 may have larger in-plane retardation between 15 to 150 nm. Typically, when the substrate 10 is made of triacetyl cellulose, it has out-of-plane retardation around −40 nm to −120 nm. This is a desired property when the compensator is designed to compensate a liquid crystal state with an ON voltage applied. The in-plane retardation discussed above is defined as the absolute value of (nx−ny)d and the out-of-plane retardation discussed above is defined as [(nx+ny)/2−nz]d, respectively. The refractive indices nx and ny are along the slow and fast axes in plane of the substrate, respectively, nz is the refractive index along the substrate thickness direction (Z-axis), and d is the substrate thickness. The substrate is preferably in the form of a continuous (rolled) support or web.

On the substrate 10, an orientation layer 20 is applied, and an anisotropic layer 30 is disposed on top of layer 20. Optionally, between the substrate 10 and the orientation layer 20, a barrier layer can be applied (barrier layer not shown in FIG. 1). Barrier layers are disclosed in copending applications Docket No. 84732, Nair et al. and Docket No. 84839, Bauer et al. hereby incorporated by reference in their entirety.

The orientation layer 20 can be oriented by various techniques. In one example, the orientation layer contains a rubbing-orientable material such as a polyimide or polyvinyl alcohol and can be oriented by a rubbing technique. In another example, the orientation layer contains a shear-orientable material and can be oriented by a shear-alignment technique. In another example, the orientation layer contains an electrically or magnetically orientable material and can be oriented by an electrical or magnetic alignment technique. In another example, the orientation layer can also be a layer of SiOx fabricated by oblique deposition. In another example, the orientation layer contains a photo-orientable material and can be oriented by a photo-alignment technique. Photo-orientable materials include, for example, photo isomerization polymers, photo dimerization polymers, and photo decomposition polymers. In a preferred embodiment, the photo-orientable materials are cinnamic acid derivatives as disclosed in U.S. Pat. No. 6,160,597. Such materials may be oriented and simultaneously crosslinked by selective irradiation with linear polarized UV light.

In a preferred embodiment, the anisotropic layer 30 is typically a liquid crystalline monomer when it is first disposed on the orientation layer 20, and is crosslinked or polymerized by a further UV irradiation, or by other means such as heat. In a preferred embodiment, the anisotropic layer contains a material such as a diacrylate or diepoxide with positive birefringence as disclosed in U.S. Pat. No. 6,160,597 (Schadt et al.) and U.S. Pat. No. 5,602,661 (Schadt et al.). The optic axis in the anisotropic layer 30 is usually tilted relative to the layer plane, and varies across the thickness direction.

The temperature at which the liquid crystal compound undergoes a phase transition between the nematic phase and the isotropic phase is defined as the transition temperature $T_c$ (also referred to as the clearing temperature).

While the type of compensator described above provides some desired optical properties, additional layers are necessary for wide viewing-angle compensation, for example, in a compensator for Twisted Nematic (TN) Liquid Crystal Displays (LCDs).

The anisotropic layer may also contain addenda such as surfactants, light stabilizers and UV initiators. UV initiators include materials such as benzophenone and acetophenone and their derivatives; benzoin, benzoin ethers, benzil, benzil ketals, fluorenone, xanthanone, alpha and beta naphthyl carbonyl compounds and various ketones. Preferred initiators are alpha-hydroxyketones.

The anisotropic layer may also contain a curable and/or polymerizable addenda such as di or triacrylate monomers, in addition to or instead of a polymerizable liquid-crystalline material.

Figure 2A:
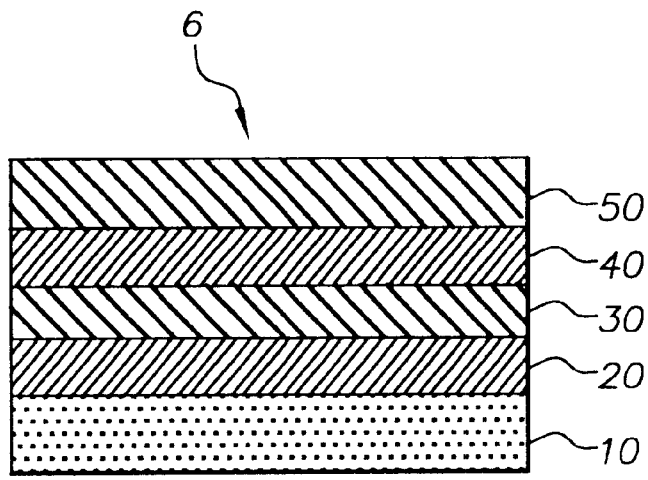
FIGS. 2A and 2B are cross-sectional schematic views of various embodiments prepared by the process of the present invention.
Figure 3:
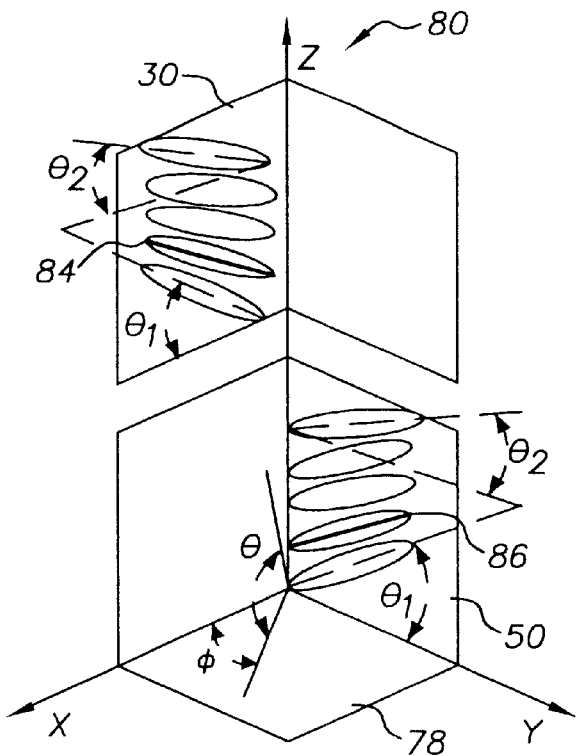
FIG. 3 is a schematic concept in accordance with the present invention.

FIG. 2A illustrates a more sophisticated optical compensator 6 that may be made in accordance with the invention, which compensator contains a second orientation layer 40 and a second anisotropic layer 50 on top of the first anisotropic layer 30. The second orientation layer 40 and the second anisotropic layer 50 can be made essentially in the same way as the first orientation layer 20 and the first anisotropic layer 30 are made, except that the direction of the orientation may vary. For the purpose of illustration, refer to an XYZ coordinate system 80 as shown in FIG. 3. The X and Y axes are parallel to the plane of substrate 78, and the Z-axis is perpendicular to the plane of substrate 78. The angle φ is measured from the X-axis in the XY plane, and referred as an azimuthal angle. The angle θ is measured from the XY plane, and referred as a tilt angle.

It should be understood that the optical axis in each of the anisotropic layers 30 and 50 can have a variable tilt angle and/or variable azimuthal angle. For example, the optic axis 84 in the anisotropic layer 30 has a variable tilt angle θ across the Z-axis ranging from $\theta_1$ to $\theta_2$. In another example, the optic axis 84 has a fixed tilt angle θ across the Z-axis, namely, $\theta_1=\theta_2$. In another example, the optic axis 84 is contained in one plane such as the XZ plane and consequently has a fixed azimuthal angle φ across the Z-axis. In another example, although the anisotropic layer 30 is still oriented along the preferred direction forced by the orientation layer at their interface, the optic axis 84 has a variable azimuthal angle φ across the Z-axis. The azimuthal angle of the optic axis 84 can be varied by adding a proper amount of chiral dopant into the anisotropic layer 30. In another example, the optic axis 84 has a variable tilt angle θ and a variable azimuthal angle φ across the Z-axis. Like the optic axis 84 of the anisotropic layer 30, the optic axis 86 of the anisotropic layer 50 can also have a fixed tilt angle, a variable tilt angle, a fixed azimuthal angle, a variable azimuthal angle, or a variable tilt angle and a variable azimuthal angle across the Z-axis. The anisotropic layers 30 and 50 typically have different optic axis. Preferably the anisotropic layer 30 is positioned orthogonally relative to the respective optic axis of the anisotropic layer 50 about an axis perpendicular to the plane of the substrate. Even though the optic axis of the anisotropic layer 30 is preferred to be orthogonal (or ±90 degrees) relative to the respective (or counterpart) optic axis of the anisotropic layer 50 about an axis perpendicular to the plane of the substrate, it should be understood that the angle between the optic axis of the two anisotropic layers can be in a range of 85 to 95 degrees to be considered as orthogonal.

For the manufacture of more complex layer structures than that illustrated in FIG. 2A, additional orientation and anisotropic layers can be applied in further steps.

Figure 2B:
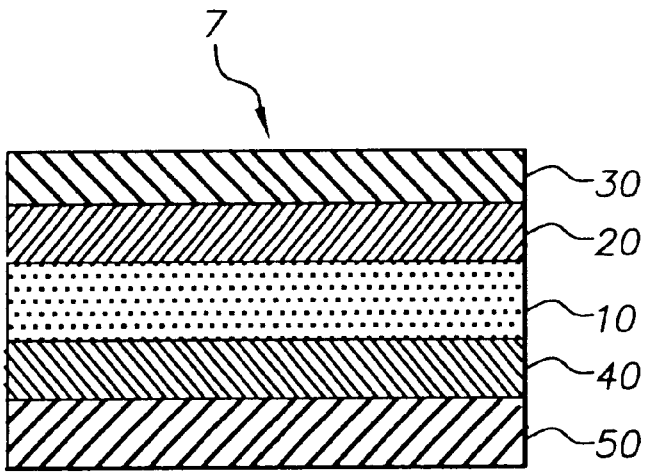

FIG. 2B illustrates another optical compensator 7 manufacturable by the inventive process in which the second orientation layer 40 and the second anisotropic layer 50 are on the opposite side of the substrate from the first orientation layer 20 and the first anisotropic layer 30.

Figure 5:
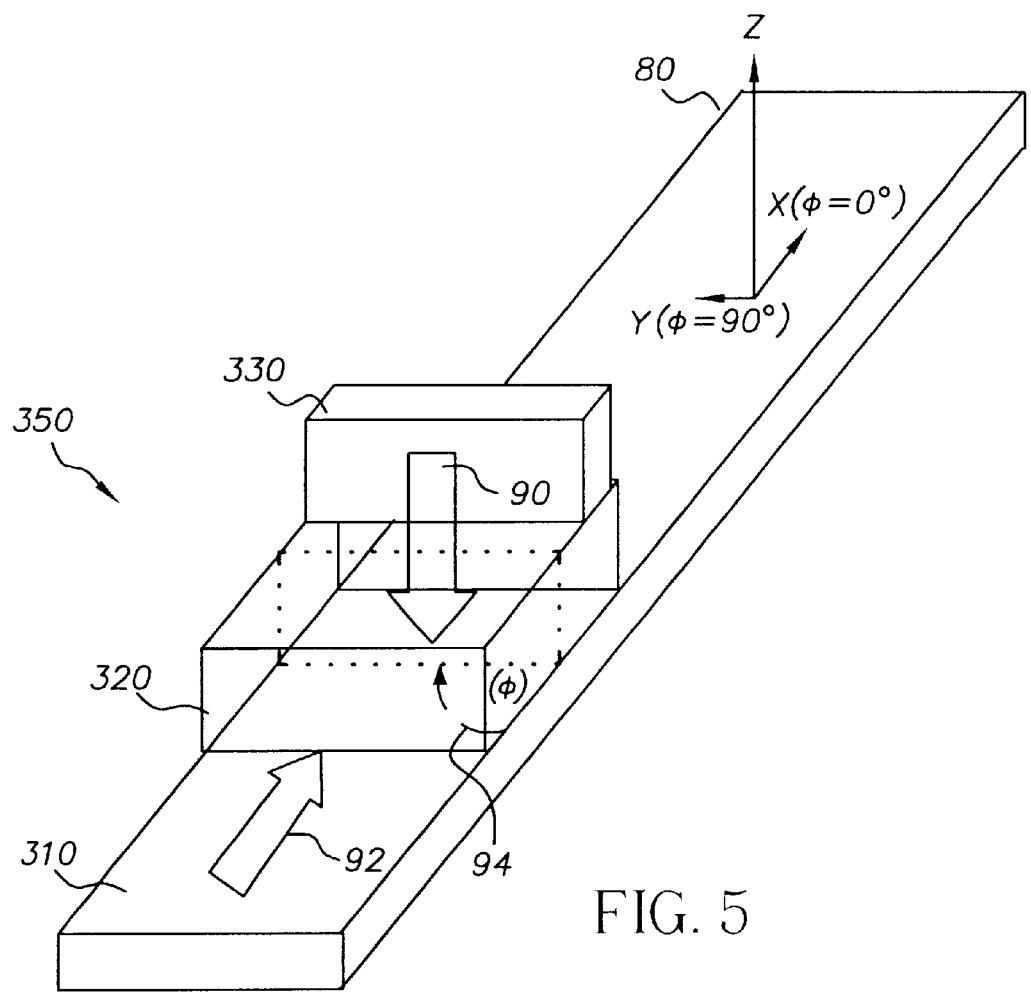
FIG. 5 shows a roll-to-roll process for making a compensator according to the present invention.

According to another aspect of the present invention, a compensator 350 can be manufactured on a roll-to-roll basis as shown in FIG. 5, which shows part of a schematic view of the process. The roll-to-roll process of forming a compensator 350 comprises the steps of applying an orientation layer 320, for example by coating the orientable material in a solvent, onto a moving substrate 310, drying the orientation layer 320, orienting the orientation layer 320 in a predetermined alignment direction φ 94, (for example φ can equal 0° to 90°) relative to the roll moving direction 92, roll coating an anisotropic layer 330 including a polymerizable material in a solvent carrier onto the orientation layer 320, drying the anisotropic layer 330, polymerizing the anisotropic layer 330 to form a continuous web of compensator. Note that for clarity, FIG. 5 only shows part of the orientation layer 320 and anisotropic layer 330.

In one embodiment, the orientation layer is oriented by rubbing the orientation layer in a direction 94 of 90 degrees (φ=90°) relative to the roll moving direction 92. In another embodiment, the orientation layer is oriented by a photo-alignment technique; for example, the orientation layer is exposed to a linearly polarized ultraviolet (UV) light indicated by 90. It may or may not be collimated, however, the projection (pointing along 94) of the principal ray of the light 90 onto the roll makes an angle of about 90 degrees relative to the roll moving direction.

Figure 4:
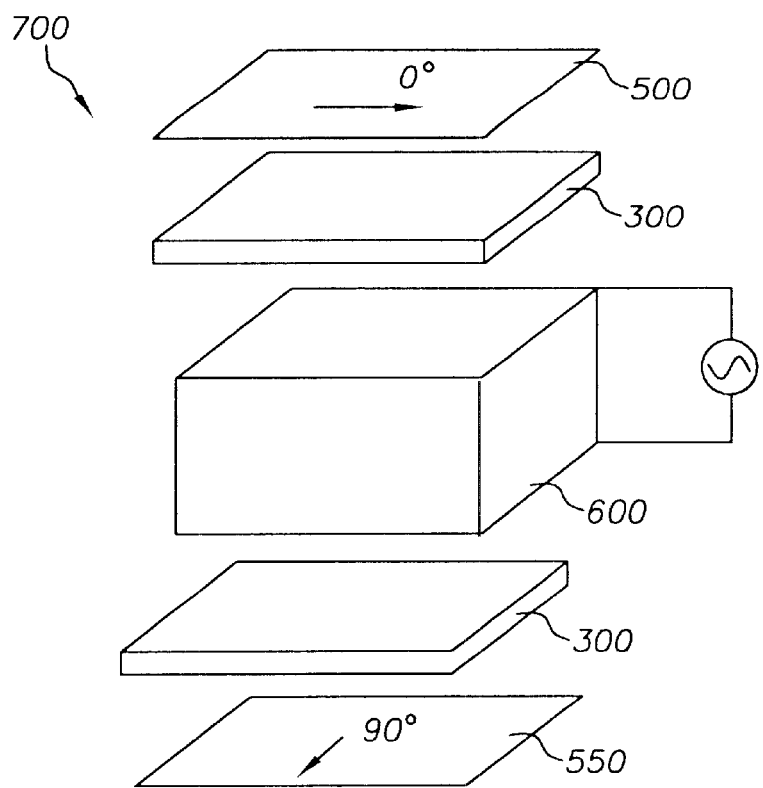
FIG. 4 shows a liquid crystal display in combination with a compensator prepared according to the present invention.

FIG. 4 is a schematic view of a liquid crystal display 700 comprising the compensator 300, also manufacturable in accordance with the present invention. In FIG. 4, one compensator 300 is placed between the first polarizer 500 and the liquid crystal cell 600, and another compensator 300 is placed between a second polarizer 550 and the liquid crystal cell 600. The liquid crystal cell 600 is preferred to be operated in a Twisted Nematic (TN), Super Twisted Nematic (STN), Optically Compensated Bend (OCB), In Plane Switching (IPS), or Vertically Aligned (VA) mode. The polarizers 550 and 500 can be arranged crossed or parallel depending on the operation principles of the liquid crystal cell. The orientation layer in the compensator can be arranged parallel, perpendicular, or at a predetermined angle relative to the first polarizer 500. The liquid crystal cell can also be operated in a reflective mode, in which it may only require one polarizer.

The compensators made by the present invention may be used in conjunction with electronic imaging device comprising a liquid crystal display device. The energy required to achieve the display device is generally much less than that required for the luminescent materials used in other display types such as cathode ray tubes. Accordingly, liquid-crystal display technology is used for a number of applications, including but not limited to digital watches, calculators, portable computers, electronic games for which light weight, low power consumption and long operating life are important features.

In one preferred embodiment for making an optical compensator, the orientation layer can be disposed on substrate on a continuous web. Preferably, the orientation layer contains a photo-orientable material such as cinnamic acid derivatives that can be oriented by a photo-alignment technique. The solvent can include a mixture of organic solvents such as MEK, cyclohexane and isopropyl acetate. After the orientation effect is achieved by linear polarized UV light, a mixture of liquid crystalline monomers such as diacrylates, UV initiator and solvent is applied onto the orientation layer. The solvent then evaporates and liquid crystalline monomers are crosslinked and/or cured by UV irradiation.

Figure 6:
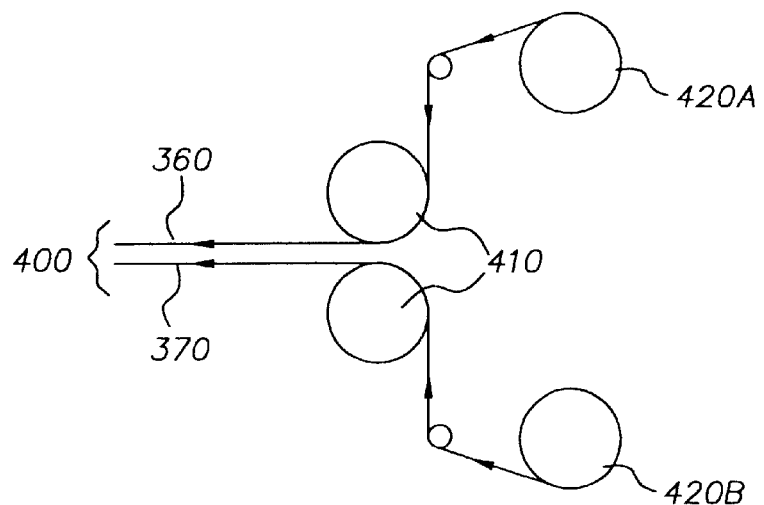
FIG. 6 shows another roll-to-roll process for making a compensator according to the present invention in which two components are bonded.

According to another embodiment of a process according to the present invention, the compensator can be manufactured on a roll-to-roll basis as shown in FIG. 6 with reference to FIG. 5. The roll-to-roll process of forming a roll of optical compensator 400 comprises the steps of coating an orientation layer 320 in a solvent onto a moving substrate 310, drying the orientation layer 320, orienting the orientation layer 320 in a predetermined alignment direction 94 of 45 degrees (φ=45°) relative to the roll moving direction 92, roll coating an anisotropic layer 330 including a polymerizable material in a solvent carrier onto the orientation layer 320, drying the anisotropic layer 330, polymerizing the anisotropic layer 330 to form a first roll of multilayer integral component 360, winding it up, repeating the above steps to form a second roll of multilayer integral component 370, and bonding together the two rolls of integral components 360, 370 made according to the above processes so that the optic axis of the anisotropic layer in one component is positioned orthogonally relative to the respective optic axis of the anisotropic layer in the other about an axis perpendicular to the plane of the substrates using a roll-to-roll laminator 410. One feature of the roll-to-roll manufacturing process according to the invention to fabricate the optical compensator 400 is that the orientation layer 320 contained in a roll of component 360 is oriented in a direction 94 of 45 degrees ($\phi$=45°) relative to the roll moving direction 92, so that when two rolls of such components (for example, 360 and 370) are bonded together by a roll-to-roll laminator 410, the anisotropic layer in one component can be positioned orthogonally relative to the anisotropic layer in the other about an axis perpendicular to the plane of the substrates.

FIG. 6 shows that two rolls of components 360 and 370 are provided from two supply rollers 420A and 420B, and are bonded together by a roll-to-roll laminator 410 to form a roll of optical compensator 400. The two rolls of components (for example, 360 and 370) can be bonded together at the substrates of the two components or at the anisotropic layers of the two components. When the two rolls of components are bonded together at the substrate of one component and the anisotropic layer of the other component, the formed roll of optical compensator 400 does not meet the requirement that the optic axis of the anisotropic layer in one component is positioned orthogonally relative to the respective optic axis of the anisotropic layer in the other about an axis perpendicular to the plane of the substrates. Instead, the optic axis of the anisotropic layer in one component is positioned parallel relative to the respective optic axis of the anisotropic layer in the other. If the orientation layers in the roll of components (for example, 360 and 370) are not oriented in a direction of 45 degrees relative to the roll moving direction, the optical compensator 400 made by bonding two rolls of such components at the anisotropic layers of the two components or at the substrates of the two components will not meet the requirement that the optic axis of the anisotropic layer in one component is positioned orthogonally relative to the respective optic axis of the anisotropic layer in the other about an axis perpendicular to the plane of the substrates. Instead, the angle between the optic axis of the anisotropic layer in one component and the optic axis of the anisotropic layer in the other is either greater than or less than 90 degrees. Although the orientation layer in the roll of component is preferred to be oriented in a direction of 45 degrees relative to the roll moving direction, it should be understood within the scope of the invention that the orientation layer can be oriented in a range of directions around 45 degrees from 40 to 50 degrees relative to the roll moving direction. Note that two rolls of components with the orientation layers oriented at two different predetermined directions may also be bonded using a roll-to-roll laminator to form a roll of optical compensator satisfying the requirement that the optic axis of the anisotropic layer in one component is positioned orthogonally relative to the respective optic axis of the anisotropic layer in the other about an axis perpendicular to the plane of the substrates.

As indicated above, the orientation layer can be oriented by a photo-alignment technique; for example, the orientation layer is exposed to a linearly polarized ultraviolet (UV) light indicated by 90. The UV light 90 makes an angle with the roll. It may or may not be collimated, however, the projection (pointing along 94) of the principal ray of the light 90 onto the roll makes an angle of about 45 degrees relative to the roll moving direction.

In a preferred process of making an optical compensator, the steps are continuously performed (i.e., performed in nonstop process). Further, it is preferred that the steps extending from the step of feeding the transparent film to the orientation treatment are continuously performed. The process can be, for example, performed according to the following steps:

a) coating a liquid composition, comprising a photoalignable resin in a solvent, to form a resin-containing coating on a continuous support;

b) drying the resin-containing coating, preferably with heated gas, to vaporize solvent for a period of 4 seconds to 10 minutes, preferably 30 seconds to 10 minutes with a heated gas to remove solvent until at least 50 percent; preferably 50 to 99 percent, more preferably at least 80 to 99 percent of the solvent is removed;

c) optionally cooling the orientable layer to below 80° C., more preferably below 60° C.; and d) orienting the orientable layer in a predetermined direction by photo-alignment;

e) heat treating the orientation layer, either before or after the alignment treatment, not necessarily at a temperature higher than drying, to relax stress built up in the coating during drying as well as continuing to remove residual solvent, wherein the relevant layer is heat treated at a temperature from 25° C. and 300° C., preferably from 40° C. and 100° C., for a period of at least 30 seconds, preferably 30 seconds to 30 minutes;

f) coating a liquid-crystal compound having liquid crystalline properties in a solvent carrier onto the orientation layer;

g) drying the liquid-crystal containing coating;

h) thermally treating the liquid-crystal-containing layer until the entire layer reaches the functionally oriented (preferably nematic phase);

The latter step preferably comprises cooling to solidify or curing (in the case of using as the compound an anisotropic material having a polymerizable or crosslinkable group) with light or heat energy and cooling the layer.

Finally, but optionally, the transparent support having the orientation layer and the anisotropic liquid-crystal layer can be wound and stored.

Preferably, the drying and heating of the orientation layer and anisotropic liquid-crystal layer is in a separate drying and heating unit. In another preferred embodiment, the drying unit for drying the orientation layer or the anisotropic liquid-crystal layer comprises air distributors to deliver air to both sides of the coated support as well as rollers and air bars. In another embodiment, a gaseous layer is moved along the coated surface at small relative rates to the movement of the coated layer as described by Suga et al. Suitably, the heating unit for the orientation layer also comprises air distributors to deliver air to both sides of the coated support as well as backside rollers that provide energy to the support via conduction. In another embodiment, the heating unit for the orientation layer comprises air flotation devices within a housing to deliver high temperature air to both sides of the coated support.

As described in further detail below, one embodiment of the invention comprises repeating the above steps in series to form a plurality of orientation layers and a plurality of anisotropic layers to form an integral component wherein the optical axis of each anisotropic layer is positioned relative to the respective optical axis of the other anisotropic layers by some small angle about an axis perpendicular to the plane of the substrates. Preferably, there are a first and second orientation layer and a first and second anisotropic layer to form an integral component so that the optical axis of the first anisotropic layer is positioned orthogonally relative to the respective optical axis of the second anisotropic layer about an axis perpendicular to the plane of the substrate (transparent film), obtained either by coating in series or in parallel.

Figure 7:
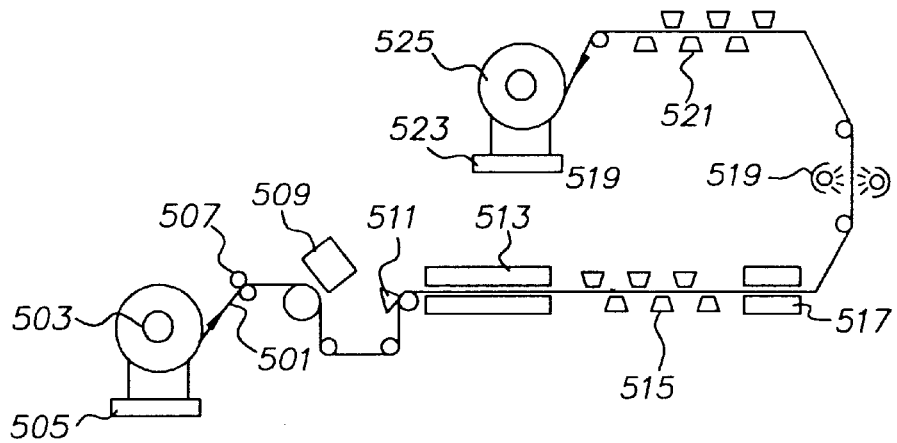
FIG. 7 shows one embodiment of a process for making a photo-aligned orientation layer on a transparent support.

The processes of the invention are explained in detail referring to the attached figures. FIG. 7 schematically shows an example of the process for the preparation of the continuous orientation layer of the invention. The continuous transparent film 501 is fed from a roll of continuous film 503 using a delivery machine 505 having a driver means. Optionally dust on a surface of the film can be removed using a surface dust-removing machine 507. A web treatment (Corona discharge, glow discharge, particle transfer roll etc.) can be performed by apparatus 509. The continuous transparent film is moved using a driving roller toward a coating machine 511. A coating liquid of a photo-alignable resin in a solvent is coated on the transparent support using the coating machine 511 to form a coated layer. Subsequently, the solvent in the coated layer is vaporized in a drying zone 513. Drying can be accomplished by IR, conduction, air convection, microwave, etc. A heat treatment is applied in a heating zone either before the alignment treatment 515 or after the alignment treatment 521. The heating means can utilize IR, conduction, air convection, etc. Optionally, the coated layer can be cooled in a cooling zone 517. The transparent film having the orientable resin layer is subjected to polarized UVB light using a polarized UVB light source 519 to form an orientation layer. The transparent support with orientation layer thereon is wound up by a wind-up machine 523 into a wound roll 525.

Figure 8:
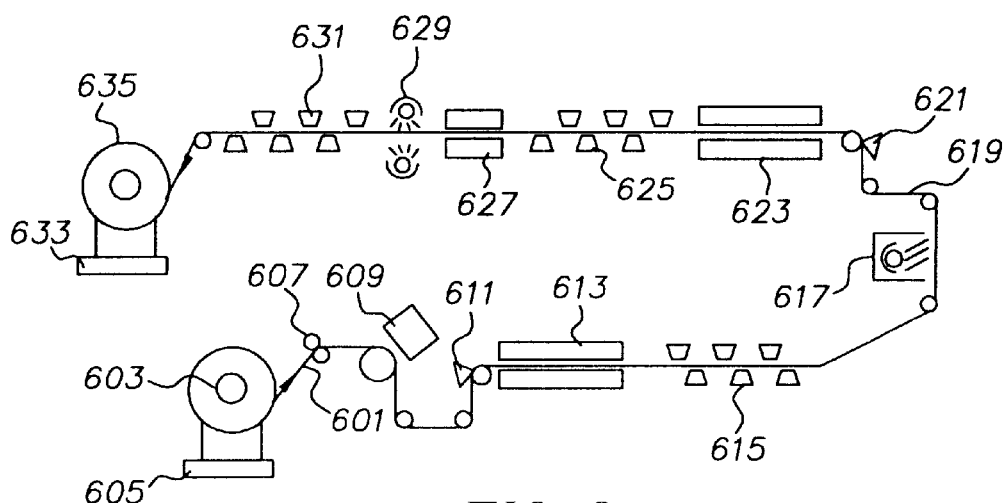
FIG. 8 shows one embodiment of a process for making a two-layer system comprising a single orientation layer and a single anisotropic liquid crystal layer.

FIG. 8 schematically shows an example of the process for the preparation of the continuous optical compensator film of the invention. The continuous transparent film 601 is fed from a roll of continuous film 603 using a delivery machine 605 having a driver means. Optionally dust on a surface of the film can be removed using a surface dust-removing machine 607. A web treatment (Corona discharge, glow discharge, particle transfer roll etc.) can be performed by apparatus 609. The continuous transparent film is moved using a driving roller toward a coating machine 611. A coating liquid of a resin for forming an orientation layer in a solvent is coated using a coater 611 on the surface of the film. The coater can be a slide, slot, gravure, roll coater, etc. The coated layer is then dried in a drying zone 613 to form a transparent resin orientable layer on the film. Drying can be accomplished by IR, conduction, air convection, microwave, etc. Heat treatment by means of heaters is also used before 615 or after 621 the alignment treatment to promote adhesion and help with optical axis orientation. The heat treatment can be accomplished by IR, conduction, air convection, etc. Optionally, the coated layer can be cooled in a cooling zone 617. The transparent film having the orientable resin layer is then subjected to UVB light using a polarized UVB light source 619 to form an orientation layer.

The continuous transparent film having the orientation layer thereon is moved using a driving roller toward a coating machine 623. A coating liquid of a liquid crystal compound having liquid crystalline property in a solvent is coated on the orientation layer using the coating machine 623 to form a coated layer. Subsequently, the solvent in the coated layer is vaporized in a dryer 625, and the coated layer is optionally heated, in a heating section 627. Again the heating and drying means can utilize IR, conduction, air convection, etc. The coated anisotropic liquid crystal compound on top of the oriented resin layer is then thermally treated 629 to form a nematic phase resulting either in a positive birefringence layer or a negative birefringence layer. Preferably, the anisotropic liquid crystal polymer compound is cooled to form a positive birefringence nematic phase. Optionally, the nematic compound can be cooled further in a cooling unit prior to solidification or curing.

In one embodiment, the anisotropic layer is exposed to ultraviolet light (UV light) emitted by UV lamp 629, which can be a non-polarized flood light, to form a cured layer. In the case that a non-polymerizable anisotropic liquid crystal compound is used, the anisotropic layer is cooled after heating to solidify the liquid crystal. The anisotropic layer is generally cooled rapidly so as not to destroy the oriented liquid crystal phase.

The transparent film having the orientation layer and the anisotropic liquid crystal layer thereon generally is checked as to if the film is acceptable on not. The optical characteristics of the transparent film can be measured, for example, by a device that determines whether the orientation condition of the anisotropic resin layer is achieved. The check can be conducted by continuously measuring the optical characteristics of the transparent film.

Subsequently, an optional heat treatment can by applied 633 in order to stress relax the transparent film having the orientation layer and further promote adhesion.

To one skilled in the art, an optional protective film can be superposed on the transparent film having the orientation layer and the layer of liquid crystal polymer compound using a laminator in such a manner that the protective film is in contact with the anisotropic liquid crystal layer to form a composite film, and the composite film is wound up in roll 637 by a wind-up machine 635.

Figure 9:
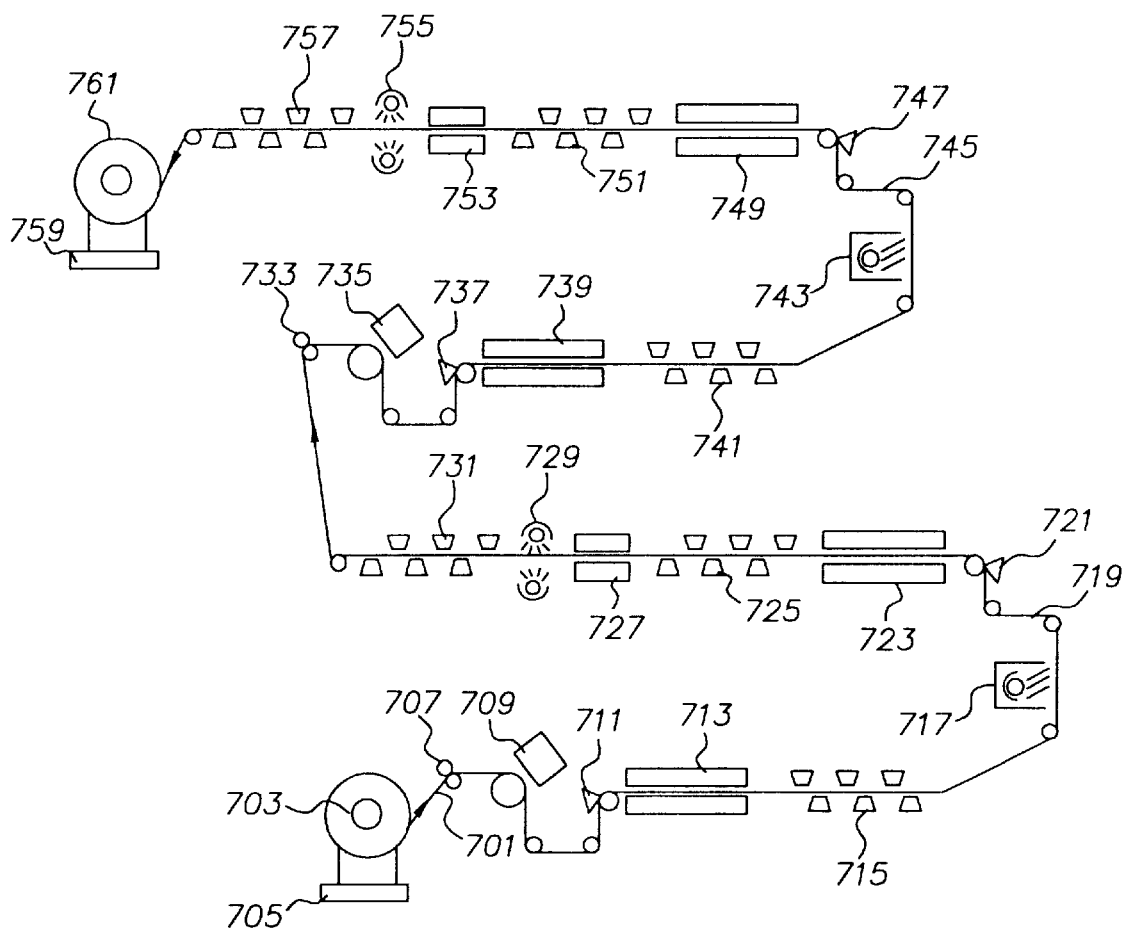
FIG. 9 shows another embodiment of a process for making a four-layer system comprising two orientation layers and two anisotropic liquid crystal layers.

FIG. 9 schematically shows another example of the process for the preparation of an optical compensator comprising two orientation layers and two anisotropic liquid crystal layers. A continuous transparent film 701 is fed from a roll of the continuous film 703 using a delivery machine 705, and driven using a driving roller. In effect the steps of 701 to 733 can be performed in the same manner as the steps explained as above referring to FIG. 8, but then instead of going into a wind up machine 635, the transparent film with an oriented layer, and an anisotropic liquid crystal layer thereon undergoes analogous formation of a second orientation layer and second anisotropic liquid crystal layer before wind up on a wound roll 765.

In detail, optionally dust on a surface of the film can be removed using a surface dust-removing machine 707. A web treatment (Corona discharge, glow discharge, particle transfer roll etc.) can be performed by apparatus 709. The continuous transparent film is moved using a driving roller toward a coating machine 711. A coating liquid of a resin for forming an orientation layer in a solvent is coated using a coater 711 on the surface of the film. The coater can be a slide, slot, gravure, roll coater, etc. The coated layer is then dried in a drying zone 713 to form a transparent photo-alignable resin layer on the film. Drying can be accomplished by IR, conduction, air convection, microwave, etc. Heat treatment by means of heaters is used before 715 or after 721 the alignment treatment to promote adhesion and help with optical axis orientation. The heat treatment can be accomplished by IR, conduction, air convection, etc.

Optionally, the coated layer can be cooled in a cooling zone 717. The transparent film having the orientable resin layer is then subjected to UVB light using a polarized UVB light source 719 to form an orientation layer.

The continuous transparent film having the orientation layer is moved using a driving roller toward a coating machine 723. A coating liquid of a liquid crystal compound having liquid crystalline property in a solvent is coated on the orientation layer using the coating machine 723 to form a coated layer.

Subsequently, the solvent in the coated layer is vaporized in a dryer 725, and the coated layer is optionally heated, in a heating section 727. Again the heating and drying means can utilize IR, conduction, air convection, etc.

The coated anisotropic liquid crystal compound on top of the oriented resin layer is then thermally treated 729 to form a nematic phase resulting either in a positive birefringence layer or a negative birefringence layer. Preferably, the anisotropic liquid crystal polymer compound is cooled to form a positive birefringence nematic phase. Optionally, the nematic compound can be cooled further in a cooling unit prior to solidification or curing. In one embodiment, the anisotropic layer is exposed to ultraviolet light (UV light) emitted by UV lamp 629, which can be a non-polarized flood light, to form a cured layer. In the case that a non-polymerizable anisotropic liquid crystal compound is used, the anisotropic layer is cooled after heating to solidify the liquid crystal. The anisotropic layer is generally cooled rapidly so as not to destroy the oriented liquid crystal phase.

Subsequently, an optional heat treatment can by applied 733 in order to stress relax the transparent film having the orientation layer and the anisotropic liquid crystal layer thereon in order to relax stresses developed during curing or solidification and to further promote adhesion.

The second orientation layer and the second anisotropic liquid crystal layer are then applied. The transparent film having the orientation layer and the anisotropic liquid crystal layer thereon can optionally have dust removed from the surface of the film using a surface dust-removing machine 735. A web treatment (Corona discharge, glow discharge, particle transfer roll etc.) can be performed by apparatus 737. The continuous transparent film with the orientation layer and anisotropic liquid crystal layer thereon is moved using a driving roller toward a coating machine 739. A coating liquid of a resin for forming an orientation layer in a solvent is coated using a coater 739 on the surface of the film. The coater can be a slide, slot, gravure, roll coater, etc. The coated layer is then dried in a drying zone 741 to form an orientable resin layer on the film. Heat treatment by means of heaters is used before 743 or after 749 the alignment treatment to promote adhesion and help with optical axis orientation. The heat treatment can be accomplished by IR, conduction, air convection, etc. Optionally, the coated layer can be cooled in a cooling zone 745.

The transparent film having the orientable resin layer is subjected to UVB light using a polarized UVB light source 747 to form a second orientation layer. The polarized UVB light source 747 is arranged such that the optical axis of the second orientation layer is positioned orthogonally relative to the respective optical axis of the first orientation layer about an axis perpendicular to the plane of the substrate. Even though the optical axis of the second anisotropic layer is preferred to be orthogonal (or ±90 degrees) relative to the respective (or counterpart) optical axis of the first anisotropic layer about an axis perpendicular to the plane of the substrate, it should be understood that the angle between the optical axis of the two anisotropic layers can be in a range of 85 to 95 degrees to be considered as orthogonal.

The continuous transparent film having the two orientation layers and the first anisotropic liquid crystal layer is moved using a driving roller toward a coating machine 751. A coating liquid of a liquid crystal compound having liquid crystalline property in a solvent is coated on the orientation layer using the coating machine 751 to form a coated layer. Subsequently, the solvent in the coated layer is vaporized in a dryer 753, and the coated layer is optionally heated in a heating section 755 to further promote adhesion of the anisotropic liquid crystal layer to the second orientation layer.

The coated anisotropic liquid crystal polymer compound on top of the oriented resin layer is then thermally treated 757 to form a nematic phase resulting either in a positive birefringence layer or a negative birefringence layer. Preferably, the anisotropic liquid crystal polymer compound is cooled to form a positive birefringence nematic phase. Optionally, the nematic compound can be cooled further in a cooling unit prior to solidification or curing.

In one embodiment, the anisotropic layer is exposed to ultraviolet light (UV light) emitted by UV lamp 759, which can be a non-polarized flood light, to form a cured layer. In the case that a non-polymerizable anisotropic liquid crystal compound is used, the anisotropic layer is cooled after heating to solidify the liquid crystal. The anisotropic layer is generally cooled rapidly so as not to destroy the oriented liquid crystal phase.

Subsequently, an optional heat treatment can by applied 761 in order to stress relax the transparent film having the orientation layer and the anisotropic liquid crystal layer in order to relax stresses developed during curing or solidification and to further promote adhesion.

The liquid coatings in the described process steps can be applied using slide coating, slot coating, gravure coating, roll coating, etc. as described in *Liquid Film Coating*, ed. Kistler and Schweizer, Chapman and Hall, 1997.

Figure 10:
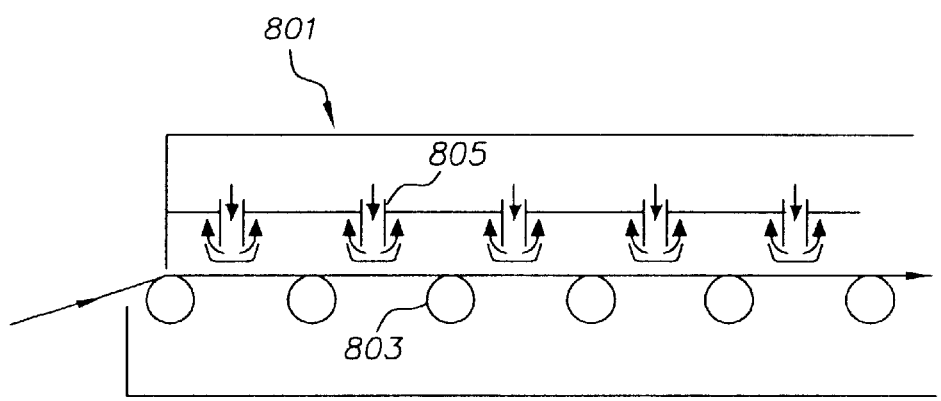
FIG. 10 shows one embodiment of a drying unit that can be used in the process of FIGS. 7 through 9.

To one skilled in the art, an optional protective film can be superposed on the optical compensator film formed above using a laminator in such a manner that the protective film is in contact with the second anisotropic nematic layer to form a composite compensator film, and the composite film is wound up by a wind-up machine 763 to form a wound roll 765. The step of drying the anisotropic nematic layer is now explained in more detail. FIG. 10 shows one embodiment of the drying zone. On the orientation layer of the moving continuous transparent film, a coating liquid of a liquid crystal compound in a solvent is coated as described previously. The transparent film having the anisotropic nematic layer thereon is moved along a drying zone 801 containing therein rollers 803 for conduction of heat to the backside of the continuous support and diffusive air baffles 805 on the coated side of the support. The diffusive air baffles 805 preferably deliver a gaseous layer to dilute vaporized solvent. In another embodiment, a gaseous layer is moved along the coated surface at small relative rates to the movement rate of the coated layer as described by Suga et al.

In the drying zone 801, the temperature generally is in the range of room temperature to 150° C., preferably 20° C. to 100° C. The running rate of the support generally is in the range of 5 to 150 m/min. (preferably in the range of 15 to 120 m/min.). The length of the drying zone generally is in the range of 0.5 to 60 m.

Figure 11:
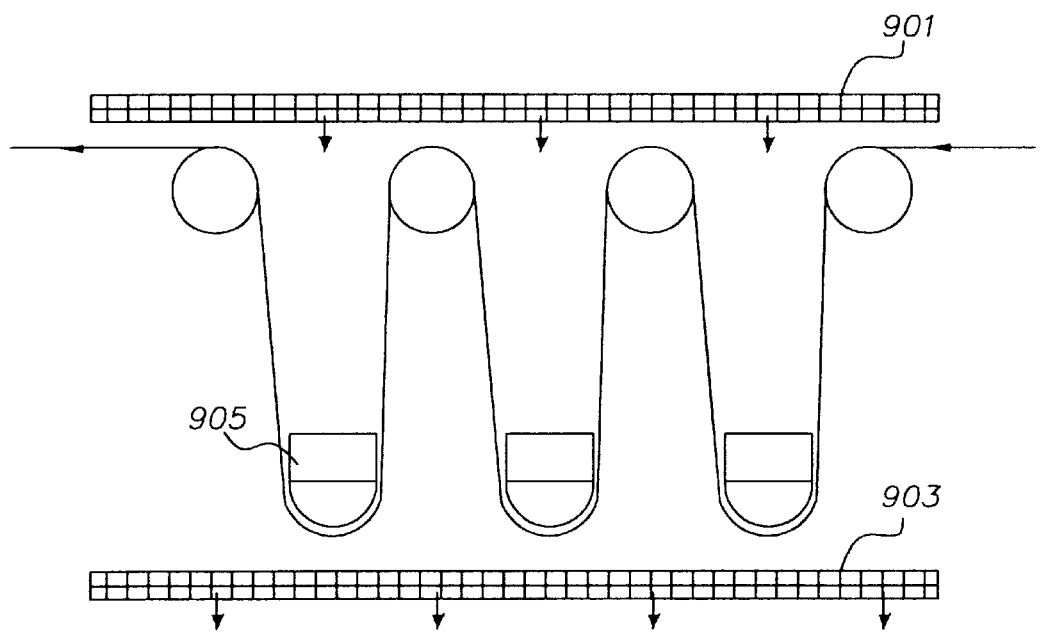
FIG. 11 shows one embodiment of a heating unit that can be used in the process of FIGS. 7 through 9.

In FIG. 11, the transparent film having the anisotropic nematic thereon layer subjected to the drying treatment is subsequently heated in a heating zone. When the heated air is blown on one side, it is preferred to blow the heated air on the side having no coated layer. The heated air is generally set to have a temperature of 30° to 300° C. FIG. 11 shows one embodiment of a heating zone where heated gas is blown from the top side of the zone through a perforated diffusing plate 901. Heated gas moves through the section and exhausts through the perforated floor of the zone 903. The continuous web moves through the section via driven rollers and air reversing bars 905.

Figure 12:
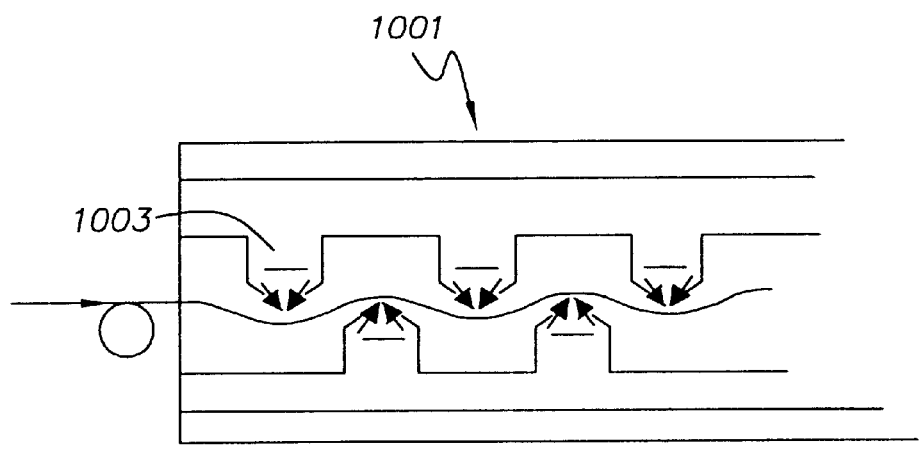
FIG. 12 shows one embodiment of a cooling unit that can be used in the process of FIGS. 7 through 9.

Examples of means for heating other than heated air include application of infrared rays and interaction of heated rolls. In one embodiment, the anisotropic layer can be cooled in a cooling zone 1001 depicted in FIG. 12 to form the nematic phase of the liquid crystal compound having liquid crystalline property. In one embodiment of the cooling zone, gas bar distributors 1003 are positioned on both sides of the continuous support containing the functional layers and cooling gas is blown against the film. The anisotropic layer is then held near or below its nematic-isotropic phase transition temperature (Tc) for at least 5 seconds, preferably 5 seconds to 30 minutes, until the anisotropic layer completely forms the desired nematic phase, preferably a positive birefringence nematic phase.

In an alternate embodiment, the cooling action can also be achieved by bringing the film into contact with cooled rollers.

In the case that a polymerizable or crosslinkable anisotropic compound is used, the obtained layer of said anisotropic compound is continuously subjected to light (preferably UV light) irradiation treatment. The ultraviolet-light irradiation device is provided in the vicinity of the cooling zone, whereby the layer of liquid-crystal compound is exposed to UV light to be cured. Subsequently, the transparent film having the orientation layer and the cured anisotropic layer is wound up, or optionally laminated with a protective film and then wound up.

The ultraviolet-light irradiation device typically has an ultraviolet lamp and a transparent plate, which UV light is passed through and shields heat rays and wind. An air for cooling is given around the ultraviolet lamp using an air fan for cooling a lamp.

Otherwise, the light irradiation treatment can be performed by moving the transparent film having the anisotropic layer to an ultraviolet-light irradiation device (generally having a permeable sheet to UV light mainly shielding cooled air) disposed over a roller, and passing through the ultraviolet-light irradiation device such that the film is supported around a roller whereby the anisotropic layer is exposed to UV light to be cured. Subsequently, the transparent film having the orientation layer and the cured anisotropic layer is wound up, or laminated with a protective film and then wound up.

By the process for the preparation of an optical compensator described above, a continuous optical compensator film having the layer of liquid crystal polymer compound can be efficiently prepared. Therefore, the process of the invention is suitable for a process for industrial preparation of the sheet or for mass production of the sheet.

The layer of optically anisotropic compound having a nematic phase is formed on the photo-aligned orientation layer. The photo-aligned orientation layer is obtained by exposing a photo-alignable resin to polarized ultraviolet light and then heat treating to achieve the desired tilt and alignment angles. The layer of optically anisotropic compound is obtained by orienting the coated layer of compound and cooling, or by orienting the coated layer of compound having polymerizable group and curing, and the layer of compound has a positive or a negative birefringence.

To one skilled in the art, the layer of optically anisotropic compound can be prepared by coating a solution of a nematic compound (and other compounds if desired) in a solvent on the orientation layer, drying, heating, cooling to the temperature for forming a positive birefringence nematic phase and, polymerizing the coated layer (e.g., by radiation of UV light). In another embodiment, the layer of optically anisotropic compound can be prepared by coating a solution of a discotic compound (and other compounds if desired) in a solvent on the orientation layer, drying, heating to the temperature for forming a negative birefringence nematic phase and, polymerizing the coating (e.g., by radiation of UV light).

The entire contents of the patents and other publications referred to in this specification are incorporated herein by reference. The present invention is illustrated in more detail by the following non-limiting examples.

EXAMPLE 1

Experimentation was performed to investigate the effect of heat treatment on adhesion of the coated layers to the transparent film support. Heat treatment refers, in these cases, to the post-drying steps of the process for the orientation layer(s) described in FIGS. 7 through 9.

To prepare samples, first a triacetyl cellulose support was coated with a subbing solution of the following composition:

70.16% acetone 27.17% methanol 1.31% water 0.15% isopropanol 0.35% cellulose nitrate 0.71% gelatin 0.14% salicylic acid This solution was applied to the TAC support at a wet coverage of 18.3 g/m$^2$ and dried. To this was applied a layer of gelatin at 2.2 g/m$^2$ dry coverage.

On top of the gelatin coated TAC a photo-alignable orientation layer was coated from the following solution at a wet coverage of 16.5 g/m$^2$:

23.30% Staralign® 2110 MEK (2% active, polyvinyl cinnamate polymer), from Vantico:

13.95% methyl ethyl ketone 22.75% cyclohexanone 40.00% n-propyl acetate

After drying to remove solvents, the samples then went through different heat treatments both before and after the photo-alignment step. Heat treatment 1 was performed before photo-alignment. Heat treatment 2 was performed after photo-alignment. Sample treatments are outlined in Table 1. The photo-alignment step consisted of exposing the orientation layer to linearly polarized UVB light at a 20 degree angle. Upon this package of layers, a solution of a diacrylate nematic liquid crystal with photoinitiator (Irgacure® 369 from Ciba) was coated at a wet coverage of 9.33 g/m$^2$ and dried to form the anisotropic liquid crystal layer. After drying, samples were heated to 55° C. for 3 minutes. All samples were then exposed to 400 mJ/cm$^2$ of UVA light to crosslink the anisotropic liquid crystal layer. The base diacrylate nematic liquid crystal material coating solution is as follows:

29.00% LCP CB483MEK (30% active, prepolymer, supplied with photoinitiator) from Vantico Co.

62.00% Toluene 9.00% ethyl acetate

Each sample was then tested for adhesive strength using a cross-hatched tape test. This test is performed by scribing small hatch marks in the coating with a razor blade, placing a piece of high tack tape over the scribed area and then quickly pulling the tape from the surface. The amount of the scribed area removed is a measure of the adhesion. Adhesion strength was rated on a scale of 1 to 5. A rating of 1 corresponded to very poor adhesion and a rating of 5 corresponded to excellent adhesion. All experimental data is summarized in Table 1, which contains the adhesion ratings for all samples.

TABLE 1

| Sample Number | Heat Treat #1 | Heat Treat #2 | Adhesion Rating |
|---|---|---|---|
| 1 | None | None | 1 |
| 2 | 100° C., 10 minutes | None | 5 |
| 3 | None | 100° C., 10 minutes | 5 |
| 4 | 100° C., 2 minutes | None | 3 |
| 5 | None | 100° C., 2 minutes | 3 |

The data in Table 1 illustrate the utility of the invention in that the inclusion of a heat treatment improved the coated layer adhesion as compared to samples that received no heat treatment step after drying.

EXAMPLE 2

Experimentation was performed to investigate the effect of heat treatment on the measured average tilt angle of the anisotropic liquid crystal layer on the transparent film support. Heat treatment refers, in this case, to the post-drying steps of the process for the orientation layer(s) described in FIGS. 7 through 9. Samples were prepared in the same manner as discussed in Example 1 and then heat treated as described in Table 2. The tilt angle of the anisotropic layer was measured by ellipsometry (J. A. Woollam Co., Model M2000V). The measured average tilt angle method had errors of ±2.0 degrees. Experimental data is summarized in Table 2, which contains the average tilt angle measurements for all tested samples.

TABLE 2

| Sample Number | Heat Treatment | Average Tilt Angle (degrees) |
|---|---|---|
| 1 | None | 20.2 |
| 2 | 100° C., 10 minutes | 21.1 |

The data in Table 2 illustrate the utility of the invention in that the inclusion of a heat treatment results in the desired average tilt angle.

PARTS LIST 5 compensator according to the present invention
6 compensator according to the present invention
7 compensator according to the present invention
10 substrate
20 orientation layer
30 anisotropic layer
40 orientation layer
50 anisotropic layer
78 plane of substrate (or XY plane)
80 XYZ coordinate system
84 optical axis in the anisotropic layer 30
86 optical axis in the anisotropic layer 50
90 UV light
92 roll moving direction
94 alignment direction
300 compensator according to the present invention
310 moving substrate
320 orientation layer
330 anisotropic layer
350 compensator according to the present invention
360 component supply roll
370 component supply roll
400 formed roll of optical compensator film
410 roll-to-roll laminator
420A component supply roll
420B component supply roll
500 polarizer
501 transparent support
503 roll of transparent support
505 delivery machine
507 dust-removing machine
509 web-treatment device
511 coating machine
513 drying unit
515 heating unit location
517 optional cooling unit
519 polarized ultraviolet light station
521 heating unit
523 wind-up machine
525 roll of transparent film with orientation layer thereon
550 polarizer
600 liquid crystal cell
700 liquid crystal display
601 transparent film
603 roll of transparent support
605 delivery machine
607 dust-removing device
609 web-treatment device
611 coating machine
613 drying unit
615 heating-unit location
617 optional cooling unit
619 polarized ultraviolet-light station
621 optional heating unit
623 coating machine
625 drying unit
627 optional heating unit
629 thermal treatment unit
631 ultraviolet light station
633 optional heating unit
635 wind-up machine
637 roll of compensator
701 transparent support
703 roll of transparent support
705 delivery machine
707 dust-removing device
709 web-treatment device
711 coating machine
713 drying unit
715 heating-unit location
717 optional cooling unit
719 polarized ultraviolet light station
721 optional heating unit
723 coating machine
725 drying unit
727 optional heating unit
729 thermal treatment unit
731 ultraviolet light station
733 optional heating unit
735 dust-removing device 737 web-treatment device
739 coating machine
741 drying unit
743 heating-unit location
745 optional cooling unit
747 polarized ultraviolet light station
749 heating unit
751 coating machine
753 drying unit
755 optional heating unit
757 thermal treatment unit
759 ultraviolet light station
761 optional heating unit
763 wind-up machine
765 roll of compensator
801 drying unit
803 roller
805 air baffle
901 air-diffusing plate
903 perforated floor of heating unit
905 air-reversing bar
1001 cooling unit
1003 gas-bar distributor
θ tilt angle
φ azimuthal angle

What is claimed is:

1. A process for making an optical compensator comprising the steps of:
  a) applying a liquid composition, comprising a photo-orientable resin in a solvent, to form a resin-containing coating on a continuous support;
  b) drying the resin-containing coating for a period of 4 seconds to 10 minutes;
  c) orienting the resin-containing layer in a predetermined direction by photo-alignment to form an orientation layer;
  d) heat treating the orientation layer, after the alignment treatment, comprising heating the orientation layer between 25° C. and 300° C. for a period of at least 30 seconds;
  e) applying a liquid comprising a liquid-crystal compound in a solvent carrier onto the orientation layer on a transparent support to form a liquid-crystal-containing coating;
  f) drying the liquid-crystal-containing coating, thereby forming a liquid-crystal-containing layer.

2. The process of claim 1 further comprising cooling the resin-containing layer to below 80° C.

3. The process of claim 1 further comprising winding up the transparent film having the orientation layer and the layer comprising the liquid-crystal compound.

4. A process for making an optical compensator comprising the steps of:
  a) applying a liquid composition, comprising a photo-orientable resin in a solvent, to form a resin-containing coating on a moving continuous support;
  b) drying the resin-containing coating for a period of 4 seconds to 10 minutes wherein at least 50 percent of the solvent is removed;
  c) heat treating the resin-containing coating, before the subsequent alignment treatment, comprising heating the resin-containing coating layer between 25° C. and 300° C. for a period of at least 30 seconds;
  d) orienting the resin-containing layer in a predetermined direction by photo-alignment to form an orientation layer;
  e) applying a liquid comprising a liquid-crystal compound in a solvent carrier onto the orientation layer on a transparent support to form a liquid-crystal-containing coating;
  f) drying the liquid-crystal-containing coating, thereby forming a liquid-crystal-containing layer.

5. The process of claim 1 or 4 wherein both the resin-containing coating and the orientation layer are heat treated, both before and after the alignment treatment, which heat treatment comprises heating the relevant layer between 25° C. and 300° C. for a period of at least 30 seconds to 30 minutes.

6. The process of claim 1 or 4 wherein the resin-containing coating is dried for a period of 4 seconds to 10 minutes until 50 to 99 percent of the solvent is removed.

7. The process of claim 1 or 4 wherein the resin-containing coating is dried for a period of 30 seconds to 10 minutes until 80 to 99 percent of the solvent is removed.

8. The process of claim 1 or 4, further comprising polymerizing and/or curing the anisotropic liquid-crystalline layer with UV radiation at a temperature below the $T_c$ of the anisotropic liquid-crystalline layer to form an integral component.

9. The process of claim 1 or 4 wherein said heat treating comprises heating between 40° C. and 100° C. for a period of at least 30 seconds to 30 minutes.

10. The process of claim 1 or 4, wherein the liquid-crystal compound is nematic or discotic compound and the functional phase is an anistropic phase that exhibits either a positive or negative birefringence.

11. The process of claim 1 or 4 wherein drying and heating of the orientation layer is in a separate drying and heating unit.

12. The process of claim 11 wherein the drying unit for drying the orientation layer comprises air distributors to deliver air to both sides of the coated support as well as rollers and air bars.

13. The process of claim 11 wherein the heating unit for the orientation layer also comprises air distributors to deliver air to both sides of the coated support as well as backside rollers that provide energy to the support via conduction.

14. The process of claim 1 or 4 further comprising repeating the above steps in series to form a plurality of orientation layers and a plurality of anisotropic layers to form an integral component wherein the optical axis of each anisotropic layer is positioned relative to the respective optical axis of the other anisotropic layers by some small angle about an axis perpendicular to the plane of the substrates.

15. The process of claim 1 or 4 further comprising repeating the above steps in series to form a second orientation layer and a second anisotropic layer to form an integral component so that the optical axis of the first anisotropic layer is positioned orthogonally relative to the respective optical axis of the second anisotropic layer about an axis perpendicular to the plane of the substrates.

16. The process of claim 14 or 15 wherein all said coatings are coated in series.

17. The process of claim 14 or 15 comprising repeating the steps of claim 1 to form a second integral component; and bonding together the first and second integral components so that the optical axis of the anisotropic layer in one component is positioned orthogonally relative to the respective optical axis of the anisotropic layer in the other about an axis perpendicular to the plane of the substrates.

18. The process of claim 14 or 15 wherein the anisotropic layers contains a material with positive birefringence.

19. The process of claim 14 or 15 wherein the optical axis of each of the anisotropic layers has a fixed azimuthal angle.

20. The process of claim 14 or 15 wherein the optical axis of each of anisotropic layer has a fixed tilt angle.

21. The process of claim 14 or 15 wherein the optical axis of each anisotropic layer has a variable tilt angle.

22. The process of claim 14 or 15 wherein the optical axis of each of the anisotropic layers has a variable tilt angle and a variable azimuthal angle.

23. The compensator of claim 1 or 4 wherein the orientable material is a poly(vinyl cinnamate).

24. The process of claim 1 or 4 wherein a slide hopper, slot hopper, rod, gravure, and/or roll coating method is used to form each of said coatings.

25. The process of claim 1 or 4 further comprising, after step f), thermally treating the liquid-crystal-containing layer to near its isotropic phase transition temperature $T_c$ for at least 5 seconds to form the functional phase, thereby forming an anisotropic liquid-crystalline layer.

26. The process of claim 1 or 4, further comprising polymerizing and/or curing the anisotropic liquid-crystalline layer with radiation at a temperature below the $T_c$ of the anisotropic liquid-crystalline layer to form an integral component.

* * * * *